(12) United States Patent
Eckert et al.

(10) Patent No.: US 12,241,761 B2
(45) Date of Patent: Mar. 4, 2025

(54) DEVICE ELEMENT COMPRISING AN OPERATING COMPONENT

(71) Applicant: BULTHAUP GMBH & CO. KG, Bodenkirchen (DE)

(72) Inventors: Marc Oliver Eckert, Bodenkirchen (DE); Ulrich Spohde, Bodenkirchen (DE)

(73) Assignee: BULTHAUP GMBH & CO. KG, Bodenkirchen (DE)

( * ) Notice: Subject to any disclaimer, the term of this patent is extended or adjusted under 35 U.S.C. 154(b) by 1175 days.

(21) Appl. No.: 17/048,057

(22) PCT Filed: Apr. 16, 2019

(86) PCT No.: PCT/EP2019/059831
§ 371 (c)(1),
(2) Date: Apr. 9, 2021

(87) PCT Pub. No.: WO2019/201941
PCT Pub. Date: Oct. 24, 2019

(65) Prior Publication Data
US 2021/0293578 A1    Sep. 23, 2021

(30) Foreign Application Priority Data
Apr. 16, 2018    (DE) .................... 10 2018 108 963.5

(51) Int. Cl.
*G01D 5/14*    (2006.01)
*F24C 7/08*    (2006.01)

(52) U.S. Cl.
CPC ............. *G01D 5/145* (2013.01); *F24C 7/081* (2013.01)

(58) Field of Classification Search
CPC ................................ G01D 5/145; F24C 7/081
(Continued)

(56) References Cited

U.S. PATENT DOCUMENTS 3,711,672 A * 1/1973 Moreland, II .......... F24C 7/083
219/625
8,330,713 B2 * 12/2012 Stelandre ................ G06F 3/046
345/184
(Continued)

FOREIGN PATENT DOCUMENTS

EP    2527747 A1    11/2012
EP    3171233 A1    5/2017
WO    2005038350 A1    4/2005

OTHER PUBLICATIONS

ISA European Patent Office, International Search Report Issued in Application No. PCT/EP2019/059831, Jul. 22, 2019, WIPO, 2 pages.

*Primary Examiner* — Eric S Stapleton
*Assistant Examiner* — Yeong Juen Thong
(74) *Attorney, Agent, or Firm* — McCoy Russell LLP

(57) ABSTRACT

The invention relates to a device element comprising an operating component, wherein said device element is designed to carry out at least one process, and the operating component is designed such that said process of the device element is carried out depending on the position of the operating component, said operating component being freely placeable relative to the device element, and a sensor system is provided which detects at least one characteristic of the operating component and actuates the process of the device element depending on this detection.

20 Claims, 4 Drawing Sheets

(58) Field of Classification Search
USPC .......................................... 219/482; 433/29
See application file for complete search history.

(56) References Cited

U.S. PATENT DOCUMENTS

| | | | | |
|---|---|---|---|---|
| 10,578,310 B2* | 3/2020 | Joo | ................ | F24C 7/088 |
| 2017/0303346 A1* | 10/2017 | Kang | ................ | H05B 6/062 |
| 2018/0301301 A1* | 10/2018 | Bach | ................ | F24C 7/082 |
| 2019/0109592 A1* | 4/2019 | Lyszus | ................ | H03K 17/968 |

* cited by examiner

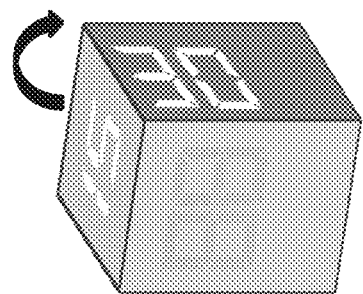
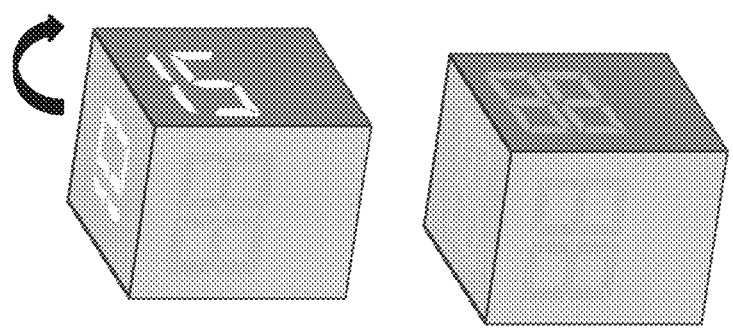
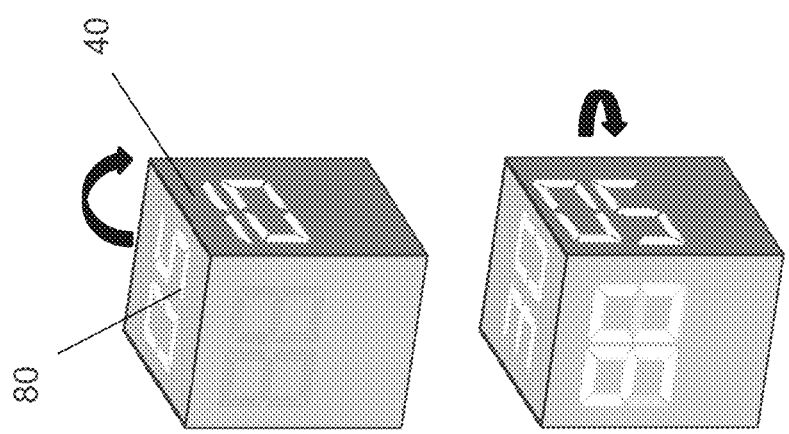
Fig. 4

DEVICE ELEMENT COMPRISING AN OPERATING COMPONENT

CROSS REFERENCE TO RELATED APPLICATIONS

The present application is a U.S. National Phase of International Patent Application No. PCT/EP2019/059831 entitled "DEVICE ELEMENT COMPRISING AN OPERATING COMPONENT," and filed on Apr. 16, 2019. International Patent Application No. PCT/EP2019/059831 claims priority to German Patent Application No. 10 2018 108 963.5 filed on Apr. 16, 2018. The entire contents of each of the above-listed applications are hereby incorporated by reference for all purposes.

TECHNICAL FIELD

The present invention relates to a furniture element having a control element, wherein the furniture element is designed to carry out at least one procedure and wherein the control element is designed such that the procedure of the furniture element is carried out in dependence on the position of the control element.

BACKGROUND AND SUMMARY

It is, for example, known from the prior art that cooktops in kitchens are operated by control elements in the form of rotary knobs. Further furniture elements customary in the living area or in kitchens such as extractor hoods or lighting devices are each associated with their own on/off switches. The actuation of all these control elements arranged at different positions is complex; apart from this, the position of rotary knobs of cooktops, etc. is at times difficult to recognize depending on their arrangement.

It is therefore the underlying object of the present invention to further develop a furniture element of the initially named kind such that its control is simpler and more flexible with respect to known solutions.

This object is achieved by a furniture element having the features of claim 1.

Provision is accordingly made that the control element can be freely positioned relative to the furniture element and that a sensor system is present that detects at least one property of the control element and controls the procedure of the furniture element or does not initiate any action of the furniture element in dependence on this detection.

It is thus the underlying idea of the present invention not to position the control element fixedly at the furniture element, but rather to arrange it freely movably relative to the furniture element and removable therefrom. The control element is thus preferably also not connected to the furniture element via a cable, but is rather only wirelessly connected to the sensor system provided that it is located at a corresponding position.

The sensor system is configured to detect at least one property of the control element (such as its position on a countertop or next to a cooktop) and to set at least one procedure of the furniture element such as the setting of the temperature of the cooktop, the switching on or off of a lighting device, of a water inflow, etc. in dependence thereon.

This detection can take place using any desired suitable technology, preferably working wirelessly, such as LCD technology, magneto striction technology, or Hall sensor systems, Bluetooth, wireless LAN, etc. These are only examples for possible communication channels between the control element and the sensor system that do not restrict the invention.

The operation of the furniture element becomes comfortable, clear, and simple for the user by means of the present invention. The arrangement of the control element is in particular largely flexible.

In an embodiment of the invention, the furniture element has an e.g. vertical or horizontal or obliquely extending surface such as a work surface, a storage surface, etc. It can in this respect be the work surface of a kitchen such as a countertop, a cooktop, etc. or a part thereof. The control element can be positioned on the work surface in this case. The work surface has the sensor system that detects at least one property of the control element such as its position on the work surface, its rotary position, which surface of the control element is disposed on the work surface, etc.

The control element is preferably a three-dimensional member. It can, for example, have the form of a bar such as a cylinder or a parallelepiped, a cube, or a pyramid, etc. These are also non-restrictive examples of the invention.

It is preferred if the control element is a non-magnetic material and a non-shielding part.

The control element preferably has a plurality of surfaces that differ to the extent that which surface faces or faces away from the sensor system can be recognized by the sensor system. The temperature of a cooktop, etc. can thus, for example, be set by rotating a cube-shaped control element.

It is also conceivable that the control element has a detection unit that is configured to detect the position, etc. in which the control element is located and to report it to the sensor system. In this case, the material or the properties of the surfaces of the control element can be identical.

The furniture element preferably has at least one region that is designed such that the positioning of the control element on this region does not control any procedure of the furniture element. This region thus equally represents a parking position of the control element. If the control element is located on this region, no action of the furniture element is initiated.

One or more regions of the furniture element are preferably furthermore present that are designed with a sensor system. This has the result that specific actions of the furniture element are initiated provided that the control element is located on the respective region. A first region can thus be present in which the lighting is activated provided that the control element is located on this region. A second region can be present, with the fan of an extractor hood being actuated when the control element is located on the corresponding region, etc.

The property of the control element detected by the sensor system can be its rotary position, with the rotary position being able to be an angle of rotation of the control element about an axis, for example, perpendicular on or at an angle to the furniture element and/or a rotary position relative to an axis of the control element itself, preferably with respect to a longitudinal axis of the control element.

The property of the control element detected by the sensor system can, for example, also be its position on the furniture element.

It is furthermore conceivable that the control element is configured to provide the user with haptic feedback, in particular with a switch feel, that depends on the controlled procedure of the furniture element. The user can thus recognize that the procedure he aims for such as the switching on of a cooktop has also actually taken place. Any other feedback to the user is also conceivable instead of haptic feedback such as an optical or acoustic signal.

The furniture element can have one or more functional units such as a fan and a lamp and the control element can be configured only to control or activate exactly one or a plurality of the functional elements. It is thus possible that only one control element is required to control a plurality of functional elements. it is also possible that a separate control element is present for each of the functional elements.

It is conceivable that the control element and/or the sensor system cooperating therewith can be configured. The procedures such as waiting times, light control, etc. triggered by the control element can thus be configured in dependence on the wish of the user.

It is conceivable that the control element has an interface for a visualization and/or an interface for the uploading of an update or of another piece of software.

The sensor system can be configured to continuously detect the property of the control element such as a rotary position of the control element.

The kind of furniture element and the action carried out thereby are arbitrary and do not restrict the invention.

In accordance with a conceivable embodiment, the furniture element is a faucet, an illumination element, a fan, a motor, an electric consumer, a display, means to output acoustic signals, an interface, an actuator, means to generate cold or heat, or a cooktop, or it has one or more of the aforesaid elements.

In a preferred embodiment, the control element has a marking such as different temperature values, that is arranged such that the arrangement of the marking correlates with the procedure triggered by the control element. The term "marking" is to be interpreted widely here and comprises, for example, numbers, letters, words, symbols, pictograms, etc. The type of marking is likewise arbitrary; it can, for example, be analog or digital.

The present invention further elates to a piece of furniture such as a piece of kitchen furniture or a piece of living room furniture or a piece of bathroom furniture having at least one furniture element comprising a control element in accordance with one of the preceding claims. The use of the piece of furniture or the kind of room is arbitrary so that any room or use is covered by the invention.

It is pointed out at this point that the terms "a" and "one" do not necessarily refer to exactly one of the elements, even though this represents a possible embodiment, but can also designate a plurality of elements. The use of the plural equally also includes the presence of the element in question in the singular and, conversely, the singular also includes a plurality of the elements in question.

Further details and advantages of the invention will be explained in more detail with reference to an embodiment shown in the drawing.

BRIEF DESCRIPTION OF THE FIGURES

There are shown:

FIG. 4: perspective views of a control element in different rotary positions.

DETAILED DESCRIPTION

Figure 1:
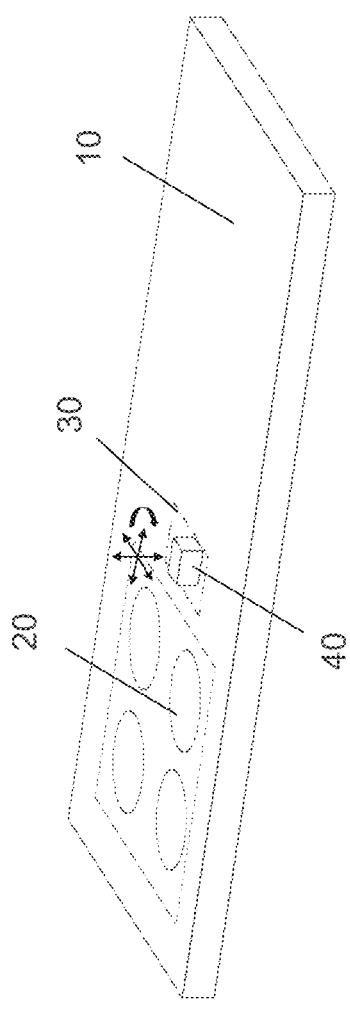
FIG. 1: a perspective view of a countertop with a cooktop and a control element.

FIG. 1 shows a countertop by the reference numeral 10 having a cooktop 20 integrated therein. A region 30 in which the control element 40 is disposed is located next to the cooktop in the countertop 10.

In this position of the control element 40, it does not initiate any action of the cooktop, i.e. none of the hobs of the cooktop are activated.

If, however, the control element 40 is removed from the region 30 and is displaced or placed into a region not shown in any more detail, the sensor system connected to this region initiates a specific action, e.g. the heating of a hob of the cooktop.

Exactly one control element is provided in FIG. 1 to control the entire cooktop. The different hobs can, for example, be activated by a corresponding positioning of the control element; a temperature setting is possible, for example, by a rotation of the control element.

Figure 2:
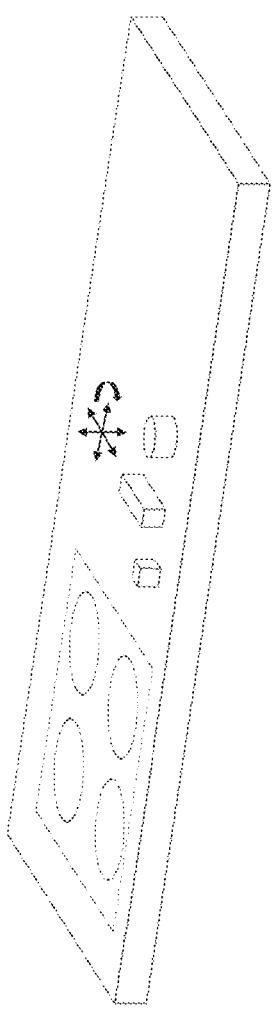
FIG. 2: a further perspective view of a countertop with a cooktop and a plurality of control elements.

FIG. 2 shows an embodiment having three control elements that can be used for the activation of different functions or procedures of the furniture element. The light can, thus, for example, be switched on and off by means of one of the control elements, the cooktop can be activated by means of a further control element, and the cooling of a region of the countertop can be activated by means of a third control element.

Figure 3:
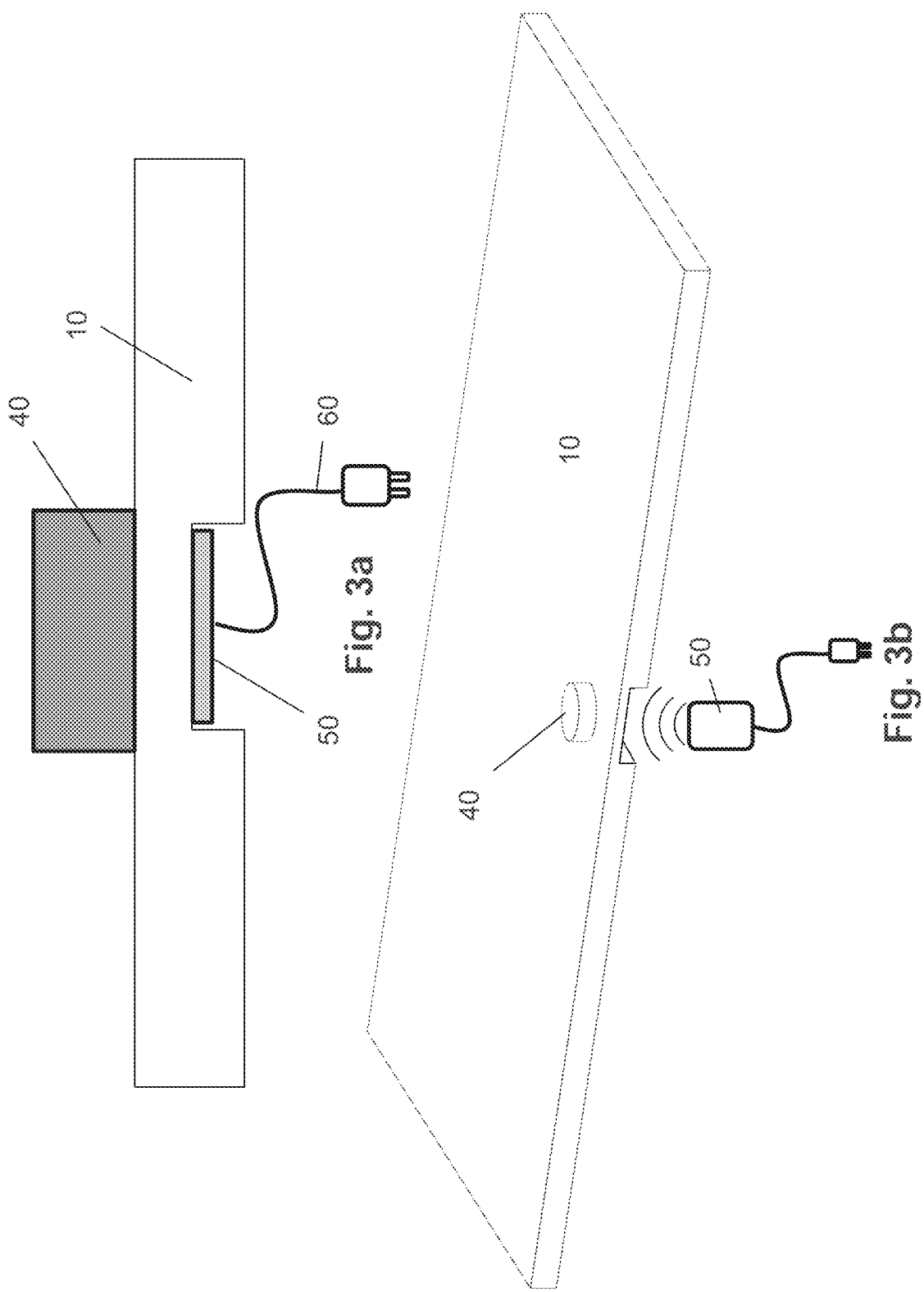
FIGS. 3a and 3b: a schematic side view or sectional view and a schematic perspective view of a countertop with a control element.

An exemplary design of a furniture element in section or in a side view (FIG. 3a)); FIG. 3b) shows the arrangement in a perspective view.

If the control element 40 is in the region of a sensor system 50 arranged beneath the work surface 10, this is recognized by the sensor system and a corresponding signal is communicated via the cable 60 to a control unit or to another logic so that the desired action is carried out.

As can in particular be seen from FIG. 3b), the data transmission, i.e. the detection whether or at which point the control element is located, takes place wirelessly.

FIG. 4 shows a control element 40 in the form of a cube in an exemplary view. Except for one side, the cube has a numerical value of 80 on each side. It can in this respect, for example, be the illuminance, a temperature, etc. The user rotates the cube so that the desired numerical value faces upward to specify the desired value. This cube position is recognized by the sensor system and the illuminant, the cooktop, etc. are controlled accordingly.

If the side of the cube 40 not provided with a number faces upward, the light, cooktop, etc. is switched off.

This example is naturally applicable to any desired other parameters.

The invention is also not restricted to numerical values. A corresponding embodiment with letters, words, symbols, etc. is also conceivable and covered by the invention.

Figure 5:
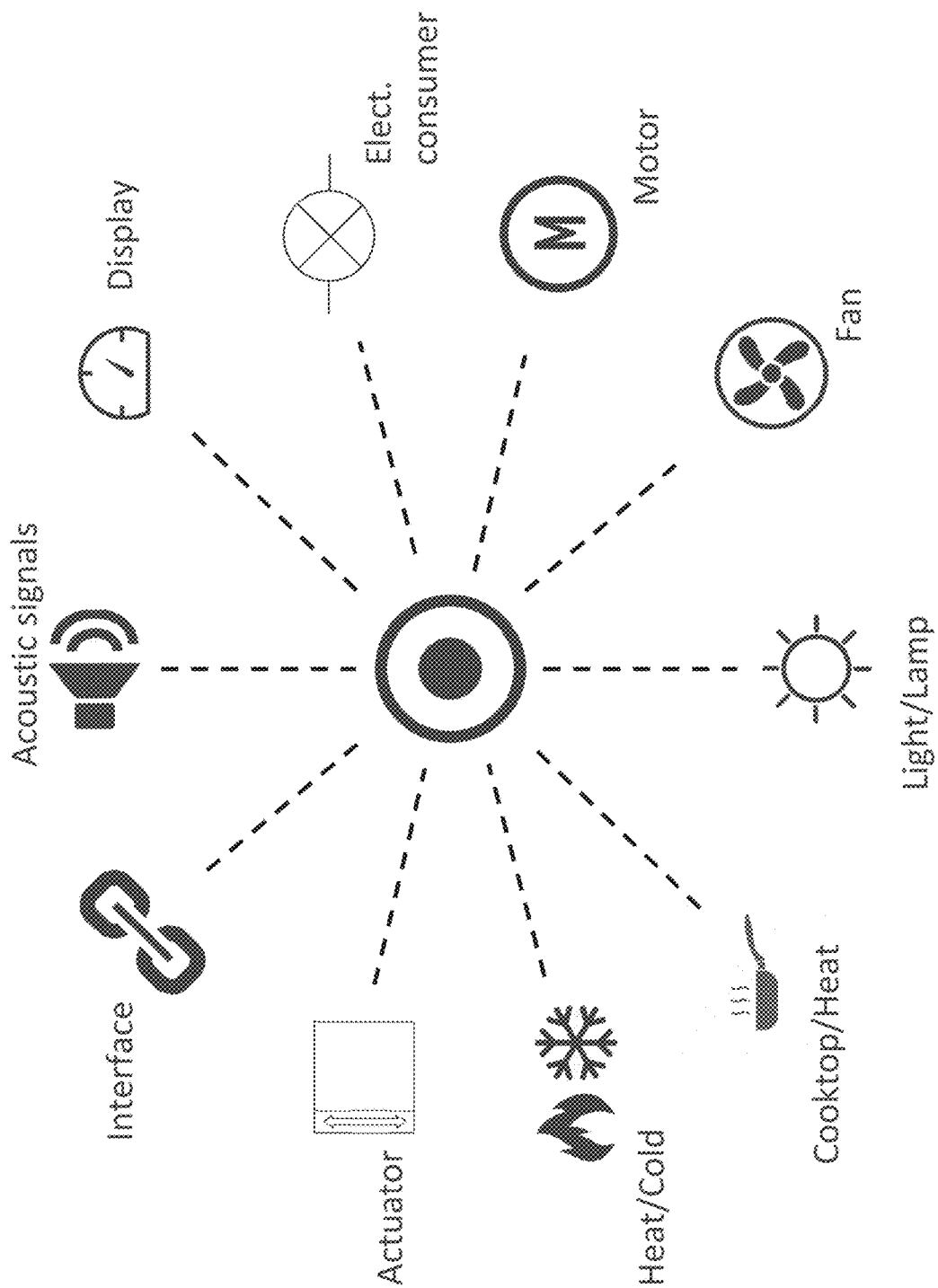
FIG. 5: an exemplary view of procedures that can be triggered by the control element.

An exemplary list of functions or procedures can be seen from FIG. 5 that can be controlled by means of the control element.

One of more of the following features are present in a conceivable embodiment:
 The control element should be freely positionable, i.e. be able to be integrated or arranged at any point of the countertop;
 The control element should be a very simple part, a suitable material (not magnetic, or shielding);

The control element should be universal (intelligent sensor system);

The control element should be removable (state: storage);

The control element should be recognized in any angular position (function begins with the rotary movement);

The control element should provide haptic feedback in dependence on the function (switch feel, optical or no detent);

The control element should at as a rotary input (any desired rotary direction, detection zone 0-360°);

The control element should have a virtual axis of rotation (center of rotation, small friction) and/or be displaceable;

The control element should be able to control different end devices;

The control element should be configurable (waiting times, light control, etc.);

The control element should provide an interface for a visualization; and

The control element should provide an update interface.

The invention claimed is:

1. A furniture element having a control element, wherein the furniture element is designed to carry out at least one procedure;
the control element is designed such that the procedure of the furniture element is carried out in dependence on a position of the control element;
wherein
the control element is freely positionable and able to be integrated at any point on a surface of the furniture element; and
a sensor system is present that detects at least one property of the control element and controls the procedure of the furniture element in dependence on this detection,
the control element having a plurality of surfaces that differ to the extent that which surface of the control element faces or faces away from the sensor system can be recognized by means of the sensor system.

2. The furniture element in accordance with claim 1, wherein the furniture element has a work surface; and wherein the control element can be positioned on the work surface, with the work surface having the sensor system.

3. The furniture element in accordance with claim 2, wherein the control element is three-dimensional.

4. The furniture element in accordance with claim 1, wherein the furniture element has at least one region that is designed such that positioning of the control element on this region does not control any procedure of the furniture element.

5. The furniture element in accordance with claim 1, wherein the property of the control element detected by the sensor system is its displacement or rotary position, with the rotary position being able to be an angle of rotation of the control element about an axis perpendicular on the furniture element and/or a rotary position relative to an axis of the control element itself.

6. The furniture element in accordance with claim 1, wherein the property of the control element detected by the sensor system is its position on the furniture element.

7. The furniture element in accordance with claim 1, wherein the control element is configured to provide a user with haptic feedback, that depends on a controlled procedure of the furniture element.

8. The furniture element in accordance with claim 1, wherein the furniture element has one or more functional units; and wherein the control element is configured to control one or more of the functional units.

9. The furniture element in accordance with claim 1, wherein the control element and/or the sensor system is/are configurable.

10. The furniture element in accordance with claim 1, wherein the control element has an interface for a visualization and/or an interface to uploading for an update or of another piece of software.

11. The furniture element in accordance with claim 1, wherein the sensor system is configured to continuously detect the property of the control element.

12. The furniture element in accordance with claim 1, wherein the sensor system is designed to detect the property of the control element wirelessly.

13. The furniture element in accordance with claim 1, wherein the furniture element is a faucet, an illumination element, a fan, a motor, an electric consumer, a display, means to output acoustic signals, an interface, an actuator, means to generate cold or heat, or a cooktop or comprises one or more of the aforesaid elements.

14. The furniture element in accordance with claim 1, wherein the control element comprises a marking that is arranged such that an arrangement of the marking correlates with the procedure triggered by the control element.

15. A piece of furniture, having at least one furniture element having the control element in accordance with claim 1.

16. The furniture element in accordance to claim 1, wherein, the control element can be recognized by the sensor system, to thus specify a desired value by the control element.

17. The furniture element in accordance with claim 3, wherein the control element has the form of a cube, a cylinder, or of a parallelepiped or of a pyramid.

18. The furniture element in accordance with claim 5, wherein the rotary position is relative to a longitudinal axis of the control element.

19. The furniture element in accordance with claim 12, wherein the sensor system is designed to detect by means of LCD technology, magnetostriction methods, or an analog Hall sensor system.

20. A furniture element designed to carry out a procedure, the furniture element comprising:
a control element designed such that the procedure of the furniture element is carried out in dependence on a position of the control element, wherein the control element is freely positionable and able to be integrated at any point on a surface of the furniture element; and
a sensor system configured to detect a property of the control element and to control the procedure of the furniture element in dependence on the property;
wherein the control element is a cube, the cube having a numerical value, word, or symbol on each of five sides and no value on a sixth side;
wherein, when the control element is positioned on the surface of the furniture element, the sensor system is configured to wirelessly detect which face of the cube faces outward from the surface of the furniture element,
wherein, when the control element is positioned on the surface of the furniture element and the sensor system detects a side of the cube facing outward from the surface of the furniture element being one of the five sides having the numerical values, words, or symbols, the procedure of the furniture element is controlled according to the numerical value, word, or symbol on the side of the cube facing outward;

wherein, when the control element is positioned on the surface of the furniture element and the sensor system detects the sixth side of the cube facing outward from the surface of the furniture element, the furniture element is switched off; and wherein, when the control element is not positioned on the surface of the furniture element, the furniture element is switched off.

* * * * *